United States Patent [19]

Ishiguro et al.

[11] 4,134,653

[45] Jan. 16, 1979

[54] SERVOAMPLIFIER IN AN AUTOMATIC DIAPHRAGM CONTROLLING DEVICE OF A CAMERA

[75] Inventors: Yasuo Ishiguro; Tomio Kurosu, both of Tokyo, Japan

[73] Assignee: Copal Company Limited, Tokyo, Japan

[21] Appl. No.: 795,630

[22] Filed: May 10, 1977

[30] Foreign Application Priority Data

May 14, 1976 [JP] Japan ................ 51-60184[U]
Jun. 1, 1976 [JP] Japan ................... 51-63994

[51] Int. Cl.² .............................................. G03B 7/10
[52] U.S. Cl. .......................................... 354/42; 354/44
[58] Field of Search ................ 354/37, 38, 41, 42, 354/44, 58, 59, 60 R, 43; 352/141; 318/640

[56] References Cited

U.S. PATENT DOCUMENTS

| | | | |
|---|---|---|---|
| 3,896,461 | 7/1975 | Higuma | 354/44 |
| 3,909,833 | 9/1975 | Sorimachi et al. | 354/44 X |
| 3,949,287 | 4/1976 | Wagensonner | 352/141 X |
| 4,010,480 | 3/1977 | Sato | 354/44 X |

*Primary Examiner*—Michael L. Gellner
*Attorney, Agent, or Firm*—Oblon, Fisher, Spivak, McClelland & Maier

[57] ABSTRACT

The automatic diaphragm controlling device comprises an electric source, a servomotor having a single driving coil for driving a diaphragm of an objective lens, a scene light indicating voltage generating circuit and a reference voltage generating circuit energized by the electric source, respectively, the servomotor being controlled by the difference between the output voltages of both circuits so that a proper exposure is obtained. The servoamplifier comprises a first operational amplifier with its inverted input terminal connected to the non-inverted input terminal of a second operational amplifier through a first resistor while the non-inverted input terminal of the first operational amplifier is connected to the inverted input terminal of the second operational amplifier through a second resistor, the junction between the first resistor and the non-inverted input terminal of the second operational amplifier being connected to the reference voltage generating circuit while the junction between the non-inverted input terminal of the first operational amplifier and the second resistor is connected to the scene light indicating voltage generating circuit, a negative feedback resistor being connected between the output terminal and the inverted input terminal of each operational amplifier, the servomotor being connected between the output terminals of both operational amplifiers. The use of two operational amplifiers permits a simple construction of the circuit while one source — one coil system of the controlling device is insured and power is greatly saved.

2 Claims, 6 Drawing Figures

SERVOAMPLIFIER IN AN AUTOMATIC DIAPHRAGM CONTROLLING DEVICE OF A CAMERA

BACKGROUND OF THE INVENTION

The present invention relates to a servoamplifier in an automatic diaphragm controlling device of a camera.

In general, two systems have been used in operating the automatic diaphragm controlling device of a camera, i.e., a single driving coil system of a servomotor for driving the diaphragm wherein the direction of flow of the current in the coil is switched from one direction to the opposite direction with the amount of the current varying accordingly depending upon the result of the measurement of the scene brightness so as to actuate the diaphragm coupled with the servomotor in one direction or in the other direction for achieving the proper exposure, and two coil system wherein one of the coils is energized to open the diaphragm by the current flowing therethrough while the other coil is energized to close the diaphragm by the current flowing therethrough, the difference in the amounts of the currents for the energization of both coils being dependent upon the result of measurement of the scene brightness so that the diaphragm is controlled for the proper exposure depending upon the scene brightness when the diaphragm is moved to a position wherein both currents are equalized.

In the two coil-system, provision of a single electric source suffices to operate the same and balance in the device is obtained when the current flowing in each coil is made equal to each other, and it is relatively easy to construct such a device. However, it has disadvantage that consumption of electric power is great, because current is flowing at all times in each coil.

It has also been proposed to reduce the current flowing in each coil to zero, when balance is achieved, while the nonsensitive range is simultaneously reduced. However, such a measure requires a very complicated construction of the device thereby rendering the device to be difficult to be manufactured.

On the other hand, a single coil system requires a pair of electric sources, but the current flown through the coil is reduced to zero when balance is achieved thereby permitting the power to be saved, and such a device is relatively easy to construct. However, middle point of the electric source is required so that even number of the batteries must be provided, and a pair of power switches are required the sequence of operations of which is determined thereby rendering the manipulation to be inconvenient. In case the electric source is used commonly for the automatic diaphragm controlling circuit and for the film feeding circuit as in the case of 8mm cinecamera, variation in the voltage occurs at one terminal of the electric source due to noise from the film feeding circuit because one terminal of the servomotor is directly connected to the electric source, so that the operation of the diaphragm controlling circuit is affected by the noise.

To avoid the above disadvantages, one coil—one electric source system has also been proposed. However, such a system requires a complicated construction and renders the cost for manufacturing the same is rendered to be high.

SUMMARY OF THE INVENTION

The object of the present invention is to provide a novel and useful servoamplifier in an automatic diaphragm controlling device of a camera, which is simple in construction and yet avoids the above described disadvantages of the prior art.

In accordance with the characteristic feature of the present invention a servoamplifier in an automatic diaphragm controlling device of a camera is provided which comprises an electric source, a servomotor having a single driving coil for driving a diaphragm of an objective lens, a scene light indicating voltage generating circuit and a reference voltage generating circuit energized by the electric source, respectively, the servomotor being controlled by the voltage differential between the output voltages of both circuits so that a proper exposure is obtained, the servoamplifier being characterized a first operational amplifier with its inverted input terminal connected to the non-inverted terminal of a second operational amplifier through a first resistor while the non-inverted input terminal of the first operational amplifier is connected to the inverted input terminal of the second operational amplifier through a second resistor, the junction between the first resistor and the non-inverted input terminal of the second operational amplifier being connected to the reference voltage generating circuit while the junction between the non-inverted input terminal of the first operational amplifier and the second resistor is connected to the scene light indicating voltage generating circuit, a negative feedback resistor being connected between the output terminal and the inverted input terminal of each operational amplifier, the servomotor being connected between the output terminals of both operational amplifiers.

By the construction of the device of the present invention, the following advantages are obtained.

(1) Since a pair of operational amplifiers are used, the construction of the circuit can be made simple while the advantages of the above described one coil - one electric source are insured.

(2) Since a single driving coil is provided in the servomotor, the construction of the device is made simple and compact.

(3) Since a single electric source is provided, number of the batteries used is not limited and only a single power switch suffices to operate the device.

(4) Since no current flows in the driving coil when proper exposure is attained, thereby permitting the power to be saved.

(5) The use of the operational amplifiers makes it possible to adjust the gain and the non-sensitive range can be set optionally.

(6) Since the voltages at both ends of the driving coil vary in the same phase upon receipt of external noise, so that the variation in the voltages is cancelled each other thereby permitting the controlled opening of the diaphtagm to be unaffected by the external noise.

In accordance with a further feature of the present invention, an operational amplifier may be provided at the output side of the scene light indicating voltage generating circuit in order to reduce the impedance of the latter, and a photoconductive element cooperating with the diaphragm or a diaphragm coupled therewith and provided in a voltage divider forming the scene light indicating voltage generating circuit may be used or a photogalvanic element cooperating with the diaphragm or a diaphragm coupled therewith and connected between the output of a voltage divider comprised of a pair of fixed resistor and the inverted input terminal of the impedance reducing operational amplifier having a negative feedback resistor may be used.

Further, in accordance with a still further feature of the present invention, the braking force of a braking coil provided for braking the actuation of the servomotor so as to stabilize the operation thereof can be adjusted independently from the adjustment of the sensitivity of the diaphragm controlling device as described later so that the performance of the device can be put in the best conditions.

DETAILED DESCRIPTION OF THE PREFERRED EMBODIMENTS

Figure 1:
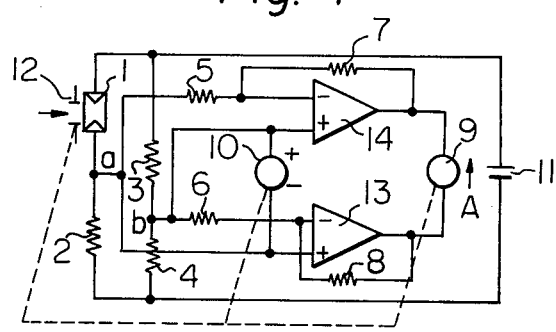
FIG. 1 is a diagram showing a first embodiment of the circuit of the servoamplifier of the present invention.

Referring to FIG. 1 showing the first embodiment of the present invention, the device of the present invention comprises a scene light indicating voltage generating circuit constituted by a voltage divider having a photoelectric element 1 such as a photoconductive element and a fixed resistor 2 connected in series with the photoelectric element 1 and energized by an electric source 11, and a reference voltage generating circuit constituted by a voltage divider having a fixed resistor 3 and a fixed resistor 4 connected in series with the fixed resistor 3 and also energized by the electric source 11. A bridge circuit is formed by connecting both circuits and the scene light indicating voltage output terminal a of the bridge circuit is connected to the non-inverted input terminal of a first operational amplifier 13 and to the inverted input terminal of a second operational amplifier 14 through a second resistor 5, while the reference voltage output terminal b of the bridge circuit is connected through a first resistor 6 to the inverted input terminal of the first operational amplifier 13 and to the non-inverted input terminal of the second operational amplifier 14. The output terminal of each operational amplifier 13, 14 is connected to the respective end of a single driving coil 9 of a servomotor, while a negative feedback resistor 8, 7 is connected between the output terminal and the inverted input terminal of each operational amplifier 13, 14. A braking coil 10 cooperating with the driving coil 9 for generating a braking force for the servomotor so as to stabilize the operation thereof is connected between the non-inverted input terminal of each operational amplifier 13, 14.

The photoconductive element 1 is located behind the objective lens diaphragm or a diaphragm 12 coupled with the objective lens diaphragm so as to receive scene light therethrough.

The servomotor is mechanically coupled with the diaphragm 12 so that the diaphragm 12 is actuated by the servomotor to vary the quantity of light received by the photoconductive element 1 thereby rendering the voltage at a to be made equal to the voltage at b.

In operation, when the scene brightness increases, the resistance value of the photoconductive element 1 is lowered so that the voltage at a is made higher than the voltage at b, and the output of the second operational amplifier 14 is lowered while the output of the first operational amplifier 13 is increased, so that current flows through the driving coil 9 in the direction indicated by the arrow A. Thus, the driving coil 9 urges the rotor of the servomotor so as to actuate the diaphragm 12 in the stopping-down direction so that the quantity of light received by the photoconductive element 1 is reduced to increase the resistance value thereof thereby lowering the voltage at a to approach the voltage at b, while, at the same time, the braking coil 10 energized by the rotor of the servomotor generates a counteracting voltage as shown in FIG. 1 so as to apply a braking force to the rotor correspondingly to the actuation of the servomotor to stabilize the actuation thereof. When the voltage at a is made equal to the voltage at b, no current flows through the driving coil 9 to denergize the servomotor to maintain the diaphragm 12 in the stopped position so that the proper exposure is achieved.

When the scene light is decreased, the device is actuated in the reverse direction described above so that, in any case, the proper exposure position is restored.

Figure 2:
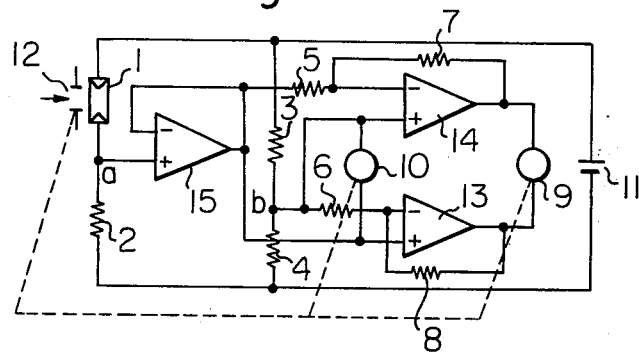
FIG. 2 is a diagram showing a modification of the circuit shown in FIG. 1.

FIG. 2 shows a modification of FIG. 1. The device shown in FIG. 2 is substantially similar in construction to that shown in FIG. 1 except that the device of FIG. 2 includes additionally an operational amplifier 15 having a negative feedback connection, the non-inverted input terminal of which is connected to the scene light indicating voltage output terminal a while the output terminal thereof is connected to the non-inverted input terminal of the first operational amplifier 13 and to the inverted input terminal of the second operational amplifier 14 through the second resistor 5.

The operation of the device of FIG. 2 is similar to that of FIG. 1. The provision of the operational amplifier 15 serves to lower the impedance at the scene light indicating voltage output side a so as to prevent the performance of the device from being deteriorated, which impedance would otherwise be increased when the scene light decreases so as to affect the amplification degree of the operational amplifiers 13, 14.

Figure 3:
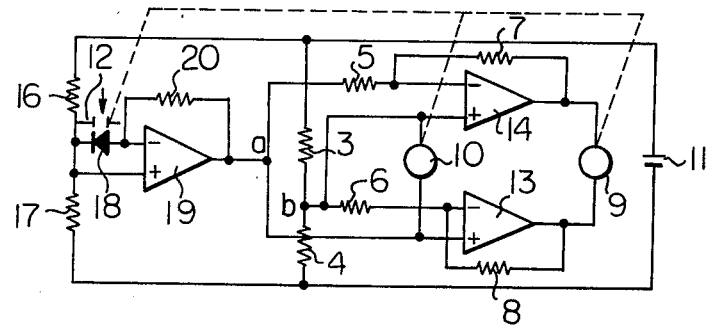
FIG. 3 is a diagram showing another embodiment of the present invention.

FIG. 3 shows another embodiment of the present invention. This device includes a photogalvanic element 18 in place of the photoconductive element 1 of FIG. 1. In this device, the output terminal of a voltage divider comprised of a fixed resistor 16 and a fixed resistor 17 connected in series to the resistor 16 is connected to the non-inverted input terminal of an operational amplifier 19 having a negative feedback resistor 20 connected between the output terminal of the operational amplifier 19 and the inverted input terminal thereof while the same output terminal of the voltage divider is connected to the inverted input terminal of the operational amplifier 19 through the photogalvanic element 18 which is located behind the diaphragm 12 so as to receive the scene light therethrough.

The voltage at a is the sum of the divided voltage at the output of the voltage divider, the voltage generated by the photogalvanic element 18 and the negative feed back voltage by the negative feedback resistor 20, and this voltage is used as the scene light indicating voltage as in the case of the embodiment of FIG. 1.

The operation of the device of FIG. 3 is substantially similar to that of FIG. 1.

In the device shown in FIGS. 1, 2 or 3, the sensitivity of the bridge circuit can only be improved together with the deterioration of the degree of the braking force of the braking coil. In other words, the input resistance value to the bridge circuit must be made small and the resistance value of the braking coil or a load resistance thereof must be made large in order to improve the sensitivity of the bridge circuit, whereas the degree of the braking force of the braking coil can be improved by reducing the resistance value of the braking coil and by increasing the input resistance value to the bridge circuit. However, it is desirous that the sensitivity of the bridge circuit can be modified independently from the adjustment of the degree of the braking force of the braking coil so as to achieve the optimum conditions of the device.

Figure 4:
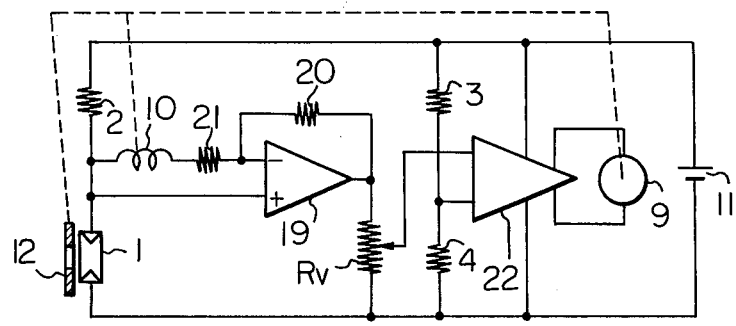
FIG. 4 is a diagram showing an embodiment of the circuit of the present invention wherein information of exposure such as the film sensitivity can be introduced in the device while the braking force of the braking coil is adjusted independently from the adjustment of the sensitivity of the servoamplifier.

FIG. 4 shows a further embodiment of the device of the present invention which enables the adjustment of the sensitivity of the bridge circuit to be effected independently from the adjustment of the degree of the braking force of the braking coil.

The device shown in FIG. 4 is substantially similar in construction and operation to those previously described except that the operational amplifier 22 is shown as a block in place of the operational amplifiers 13, 14. In the device of FIG. 4, however, the braking coil 10 is connected between the output of the scene light indicating voltage generating circuit comprised of the photoconductive element 1 and the resistor 2 and the input resistor 21 of the operational amplifier 19. Thus, the braking coil 10 can be adjusted independently by modifying the amplification degree of the operational amplifier 19, i.e., the resistance value of the resistors 21, 20 from the bridge circuit the sensitivity of which can be adjusted by modifying the input resistance value to the operational amplifier 22 independently from the adjustment of the braking coil 10.

Further, the device of FIG. 4 includes a potentiometer or a variable resistor RV connected between the output terminal of the operational amplifier 19 and the input terminal of the operational amplifier 22 as shown. Thus, by adjusting the resistance value of the variable resistor RV, the exposure factor such as the sensitivity of the film can be introduced in the device for achieving the proper exposure.

Figure 5:
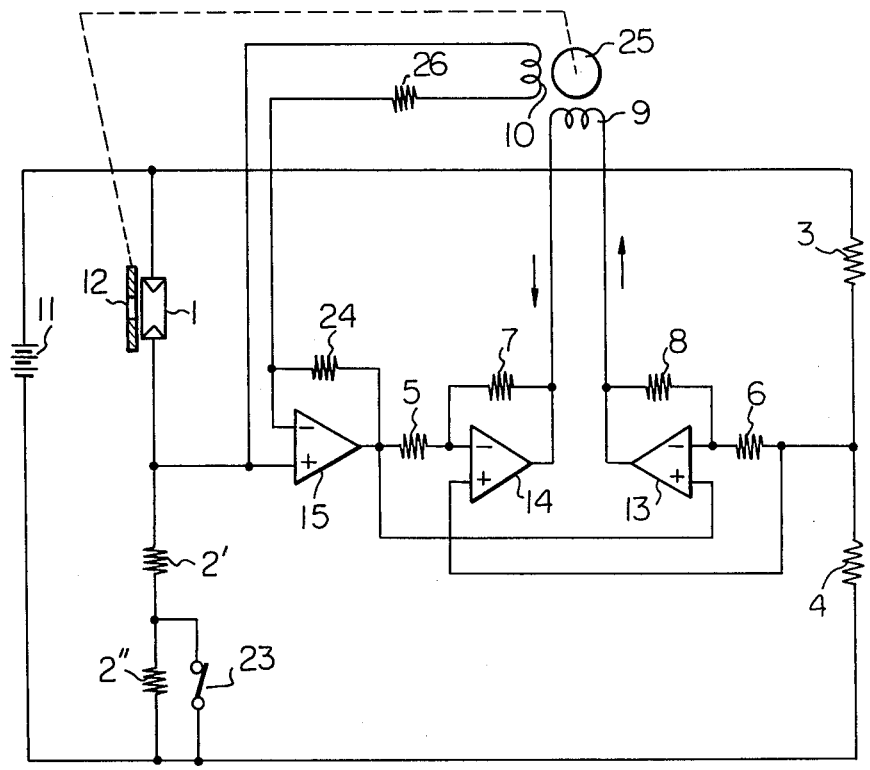
FIG. 5 is a diagram showing the modification of FIG. 4.

FIG. 5 shows a modification of FIG. 4. The device of FIG. 5 is substantially similar to those shown in FIGS. 2 and 4 except that the braking coil 10 cooperating with the rotor 25 of the servomotor together with the driving coil 9 is connected between the non-inverted input terminal of the operational amplifier 15 and the junction of the inverted input terminal of the operational amplifier 15 and one end of a negative feedback resistor 24 the other end of which is connected to the output terminal of the operational amplifier 15, a load resistance 26 being provided in the braking coil 10, while resistors 2' and 2" in series connection are connected in series to the photoconductive element 1 so as to constitute the voltage divider forming the scene light indicating voltage generating circuit, the junction between the resistors 2' and 2" being connected to the minus terminal of the electric source 11 through a switch 23 so as to permit the exposure factor such as the film sensitivity to be introduced in the device by closing or opening the switch 23.

The operation of the device of FIG. 5 is substantially similar to those described previously, and the sensitivity of the bridge circuit is adjusted by the adjustment of the operational amplifiers 13, 14, i.e., by the adjustment of the input resistors 6.5 and/or the feedback resistors 8, 7, while the braking force of the braking coil 10 can be adjusted by the adjustment of the sensitivity of the operational amplifier 15, i.e., by the adjustment of the resistor 24 and/or the resistor 26 independently from the adjustment of the sensitivity of the bridge circuit.

Figure 6:
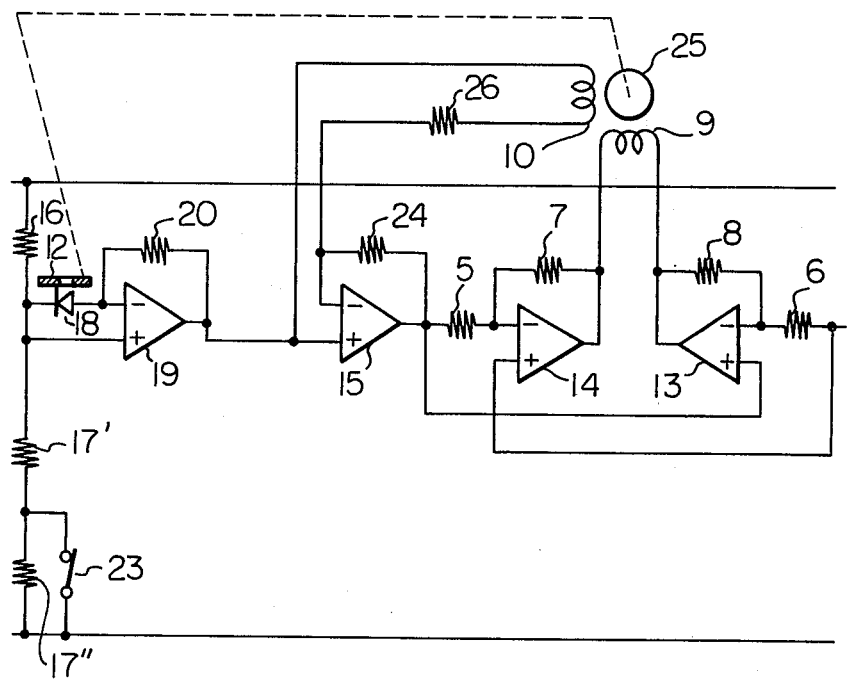
FIG. 6 is a fragmentary diagram showing a further modification of FIG. 4.

FIG. 6 shows a further modification of FIG. 4. This device is substantially similar to those shown in FIGS. 3 and 5, in which, however, the arrangement of photogalvanic element 18 and the operational amplifier 19 is applied to the embodiment of FIG. 5.

The operation of the device of FIG. 6 is similar to those shown in FIGS. 3 and 5.

We claim:

1. Servoamplifier for an automatic diaphragm controlling device of a camera having an electric source, a servomotor having a single driving coil for driving the objective lens diaphragm of said camera, a scene light indicating voltage generating circuit energized by said electric source and adapted to generate a scene light indicating voltage indicative of the scene brightness but controlled so as to be varied as a function of the aperture of said diaphragm, a reference voltage generating circuit energized by said electric source, said driving coil being so connected to said scene light indicating voltage generating circuit and said reference voltage generating circuit that said servomotor drives said diaphragm in response to the voltage differential between the output voltages of said scene light indicating voltage generating circuit and said reference voltage generating circuit thereby permitting the proper exposure to be obtained when said voltage differential reaches zero, wherein the improvement comprises a first operational amplifier, a second operational amplifier, a first resistor and a second resistor, the inverted input terminal of said first operational amplifier being connected to the non-inverted input terminal of said second operational amplifier through said first resistor while the non-inverted input terminal of said first operational amplifier is connected to the inverted input terminal of said second operational amplifier through said second resistor, the junction of said first resistor and the non-inverted input terminal of said second operational amplifier being connected to the output terminal of said reference voltage generating circuit while the junction of the non-inverted input terminal of said first operational amplifier and said second resistor is connected to the output terminal of said scene light indicating voltage generating circuit, a negative feedback resistor being connected between the output terminal and the inverted input terminal of each of said first and said second operational amplifiers while said driving coil of said servomotor is connected between the output terminals of said first and second operational amplifiers, said scene light indicating voltage generating circuit comprising a voltage dividing circuit consisting of a pair of series connected resistors, a photogalvanic element located behind said objective lens diaphragm so as to receive scene light therethrough and an operational amplifier having a negative feedback resistor, said photogalvanic element being connected between the junction of said pair of resistors and the inverted input terminal of said operational amplifier, the non-inverted input terminal of said operational amplifier being connected to said junction of said pair of resistors while the output terminal of said operational amplifier is connected to the junction between the non-inverted input terminal of said first operational amplifier and said second resistor.

2. Servoamplifier for an automatic diaphragm controlling device of a camera having an electric source, a servomotor having a single driving coil for driving the objective lens diaphragm of said camera, a scene light indicating voltage generating circuit energized by said electric source and adapted to generate a scene light indicating voltage indicative of the scene brightness but controlled so as to be varied as a function of the aperture of said diaphragm, a reference voltage generating circuit energized by said electric source, said driving coil being so connected to said scene light indicating voltage generating circuit and said reference voltage generating circuit that said servomotor drives said diaphragm in response to the voltage differential between the output voltages of said scene light indicating voltage generating circuit and said reference voltage generating circuit thereby permitting the proper exposure to be obtained when said voltage differential reaches zero, wherein the improvement comprises a first operational amplifier, a second operational amplifier, a first resistor and a second resistor, the inverted input terminal of said first operational amplifier being connected to the non-inverted input terminal of said second operational amplifier through said first resistor while the non-inverted input terminal of said first operational amplifier is connected to the inverted input terminal of said second operational amplifier through said second resistor, the junction of said first resistor and the non-inverted input terminal of said second operational amplifier being connected to the output terminal of said reference voltage generating circuit while the junction of the non-inverted input terminal of said first operational amplifier and said second resistor is connected to the output terminal of said scene light indicating voltage generating circuit, a negative feedback resistor being connected between the output terminal and the inverted input terminal of each of said first and said second operational amplifiers while said driving coil of said servomotor is connected between the output terminals of said first and second operational amplifiers, said scene light indicating voltage generating circuit comprising a voltage dividing circuit consisting of a pair of series connected resistors, a photogalvanic element located behind a diaphragm coupled with said objective lens diaphragm so as to receive scene light through the former diaphragm and an operational amplifier having a negative feedback resistor, said photogalvanic element being connected between the junction of said pair of resistors and the inverted input terminal of said operational amplifier, the non-inverted input terminal of said operational amplifier being connected to said junction of said pair of resistors while the output terminal of said operational amplifier is connected to the junction between the non-inverted input terminal of said first operational amplifier and said second resistor.

* * * * *